United States Patent
Kim et al.

(10) Patent No.: US 11,368,730 B2
(45) Date of Patent: Jun. 21, 2022

(54) APPARATUS AND METHOD FOR TRANSMITTING BROADCAST CONTENT BASED ON ATSC 3.0, AND APPARATUS AND METHOD FOR RECEIVING BROADCAST CONTENT BASED ATSC 3.0

(71) Applicants: ELECTRONICS AND TELECOMMUNICATIONS RESEARCH INSTITUTE, Daejeon (KR); Foundation for Research and Business, Seoul National University of Science and Technology, Seoul (KR)

(72) Inventors: Sung Hoon Kim, Daejeon (KR); Chung Hyun Ahn, Daejeon (KR); Dong Ho Kim, Seoul (KR); Bong Seok Seo, Uijeongbu-si (KR); Chang Jong Hyun, Seoul (KR)

(73) Assignees: ELECTRONICS AND TELECOMMUNICATIONS RESEARCH INSTITUTE, Daejeon (KR); FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/004,318

(22) Filed: Aug. 27, 2020

(65) Prior Publication Data

US 2021/0067821 A1    Mar. 4, 2021

(30) Foreign Application Priority Data

Aug. 27, 2019   (KR) .................. 10-2019-0105277
Oct. 18, 2019   (KR) .................. 10-2019-0130220
Aug. 27, 2020   (KR) .................. 10-2020-0108474

(51) Int. Cl.
    *H04N 21/236*   (2011.01)
    *H04N 21/643*   (2011.01)
    (Continued)

(52) U.S. Cl.
    CPC ... *H04N 21/23614* (2013.01); *H04N 21/2353* (2013.01); *H04N 21/6112* (2013.01); *H04N 21/64322* (2013.01)

(58) Field of Classification Search
    CPC ........ H04N 21/2362; H04N 21/64322; H04N 21/4345; H04N 21/235; H04N 21/6112;
    (Continued)

(56) References Cited

U.S. PATENT DOCUMENTS

| 8,782,721 B1 * | 7/2014 | Kellicker ......... H04N 21/44008 725/91 |
| 10,356,451 B2 * | 7/2019 | Oh .......................... H04N 21/84 |

(Continued)

FOREIGN PATENT DOCUMENTS

| KR | 10-2018-0088383 A | 8/2018 |
| KR | 10-2019-0068477 A | 6/2019 |

(Continued)

OTHER PUBLICATIONS

Advanced Television Systems Committee, "ATSC Standard: Captions and Subtitles (A/343)", Oct. 10, 2018.
(Continued)

*Primary Examiner* — Jason Salce
(74) *Attorney, Agent, or Firm* — LRK Patent Law Firm

(57) ABSTRACT

A broadcast content transmission method includes checking input of moving caption data, configuring signaling information of the moving caption data based on signaling and description defined in a broadcast service system, configuring broadcast content data, into which the signaling information of the moving caption data is inserted, and transmit-
(Continued)

ting the broadcast content data, into which the signaling information of the moving caption data is inserted.

14 Claims, 18 Drawing Sheets

(51) Int. Cl.
*H04N 21/235* (2011.01)
*H04N 21/61* (2011.01)

(58) Field of Classification Search
CPC .. H04N 21/236; H04N 21/2381; H04N 21/84; H04N 21/2343; H04N 21/435; H04N 21/2353; H04N 21/643
See application file for complete search history.

(56) References Cited

U.S. PATENT DOCUMENTS

| | | | |
|---|---|---|---|
| 10,411,933 B2 | 9/2019 | Park et al. | |
| 10,638,172 B2* | 4/2020 | Oh | H04N 21/2362 |
| 10,666,549 B2* | 5/2020 | Oh | H04L 45/16 |
| 10,917,669 B2* | 2/2021 | Oh | H04N 21/2381 |
| 2018/0176637 A1 | 6/2018 | Cho et al. | |
| 2018/0205975 A1* | 7/2018 | Oh | H04N 21/2362 |
| 2018/0249167 A1* | 8/2018 | Deshpande | H04N 19/46 |
| 2019/0281330 A1* | 9/2019 | Oh | H04N 21/84 |
| 2019/0327500 A1 | 10/2019 | Yang et al. | |
| 2021/0058680 A1* | 2/2021 | Kitazato | H04J 3/00 |

FOREIGN PATENT DOCUMENTS

| | | |
|---|---|---|
| KR | 10-2019-0083667 A | 7/2019 |
| WO | 2017/090457 A1 | 6/2017 |

OTHER PUBLICATIONS

Minho Kim et al., "Implement closed captioning systems for the deaf", Journal of Korea Game Society Feb. 2016; 16(1): 103-110.
Telecommunications Technology Association, "Assistive Broadcasting SErvices for the Vision and Hearing Impaired", TTAK.KO-07.0093/R2, Dec. 19, 2018.

* cited by examiner

FIG. 4

```
<?xml version="1.0" encoding="utf-8"?>
<MPD xmlns="urn:mpeg:dash:schema:mpd:2011" ...>
  <ProgramInformation>...</ProgramInformation>
  <Period start="PT0.0S">
    <AdaptationSet contentType="video" ...>...</AdaptationSet>
    <AdaptationSet contentType="audio" ...>...</AdaptationSet>
    <AdaptationSet contentType="text" lang="kor" segmentAlignment="true" ...>
      <Role schemeIdUri="urn:mpeg:dash:role:2011" value="main"/>
      <Representation id="kor-caption" xlink:href="..." bandwidth="3000" codecs="stpp" >
        <SegmentTemplate timescale="1000" duration="3000" initialization="$Representation$init.mp4" media="$Representation$Numbers.mp4" startNumber="3"/>
      </Representation>
    </AdaptationSet>
  </Period>
</MPD>
```

```
<?xml version="1.0" encoding="UTF-8"?>
<bundleDescriptionROUTE
xsi:schemaLocation="http://www.atsc.org/XMLSchemas/ATSC:
ROUTEUSD.xsd"
xmlns:routeusd="http://www.atsc.org/XMLSchemas/ATSC3/D
xmlns:xsi="http://www.w3.org/2001/XMLSchema-instance">
  <userServiceDescription serviceId="601"
  globalServiceID="urn:atsc:serviceid:uhd">
    <deliveryMethod>
      <broadcastAppService>
        <basePattern>audio_101_</basePattern>
        <basePattern>kor-caption-</basePattern>
        <basePattern>APNG-caption-</basePattern>
        <basePattern>video_100_</basePattern>
      </broadcastAppService>
    </deliveryMethod>
  </userServiceDescription>
</bundleDescriptionROUTE>
```

| Element of Attribute Name | Use | Data Type | Description |
|---|---|---|---|
| BundleDescriptionROUTE | | | Root element of the User Service Bundle Description for ROUTE/DASH. |
| UserServiceDescription | 1 | | A single instance of an ATSC 3.0 Service. |
| @serviceId | 1 | unsignedShort | Reference to corresponding service entry in the (SLT). |
| @serviceStatus | 0..1 | boolean | Specify the status of this service as active or inactive. |
| Name | 0..N | string | Name of the ATSC 3.0 service. |
| @lang | 1 | lang | Language of the ATSC 3.0 service name. |
| ServiceLanguage | 0..N | lang | Available languages of the ATSC 3.0 service. |
| DeliveryMethod | 0..N | | Container of transport-related information pertaining to the contents of the service over broadcast and (optionally) broadband modes of access. This element is not applicable to and therefore shall be absent for EAS-only EAServices. |
| BroadcastAppService (520) | 0..N | | A DASH Representation delivered over broadcast containing the corresponding media component(s) belonging to the ATSC 3.0 Service. |
| BasePattern (521) | 1..N | string | A character pattern for use by the ATSC receiver to match against any portion of the Segment URL used by the DASH Client to request DASH Media Segments of a parent DASH Representation. |
| UnicastAppService | 0..N | | A DASH Representation delivered over broadband containing the constituent media content component(s) belonging to the ATSC 3.0 Service. |
| BasePattern | 1..N | string | A character pattern for use by the ATSC receiver to match against any portion of the Segment URL used by the DASH Client to request DASH Media Segments of a parent DASH Representation. |

FIG. 6A

```xml
<?xml version="1.0" encoding="UTF-8"?>
<bundleDescriptionMMT
xsi:schemaLocation="http://www.nextb.or.kr/XMLSchemas/T-UHDTV/Delive
xmlns:mmtusd="http://www.atsc.org/XMLSchema/ATSC3/Delivery/MMTUR
xmlns="http://www.nextb.or.kr/XMLSchemas/T-UHDTV/Delivery/MMTUSD
xmlns:xsi="http://www.w3.org/2001/XMLSchema-instance">
    <userServiceDescription serviceStatus="false" serviceId="960"
    globalServiceId="urn:sa:service:960">
        <Name lang="ko">KB</Name>
        <broadbandComponent/>
        <ComponentInfo componentName="hev1" componentId="7cbc4559-
        2a08-4235-9f0a-207aaf594924" componentProtectedFlag="true"
        componentRole="0" componentType="1"/>
        <ComponentInfo componentName="mhm1" componentId="08046Za8-
        4182-4472-8ee5-04fd07a49b5e" componentProtectedFlag="true"
        componentRole="0" componentType="2"/>
        <ComponentInfo componentName="stpp" componentId="subtitle://1"
        componentRole="0" componentType="2"/>
        <ComponentInfo componentName="stpp" componentId="subtitle://2"
        componentRole="0" componentType="2"/>
    </userServiceDescription>
</bundleDescriptionMMT>
```

FIG. 6B

| ComponentInfo | 0..N | |
| --- | --- | --- |
| @componentType | 1 | unsignedByte |
| @componentRole | 1 | unsignedByte |
| @componentProtectedFlag | 0..1 | boolean |
| @componentId | 1 | string |
| @componentName | 0..1 | string |

FIG. 7A

Table 7.27 Bit Stream Syntax for caption_asset_descriptor()

| Syntax | No. of Bits | Format |
|---|---|---|
| caption_asset_descriptor() { | | |
|   descriptor_tag | 16 | uimsbf |
|   descriptor_length | 16 | uimsbf |
|   number_of_assets | 8 | uimsbf |
|   for (i=0; i<number_of_assets; i++) { | | |
|     asset_id_length | 32 | uimsbf |
|     for (j=0; j<asset_id_length; j++) { | | |
|       asset_id_byte | 8 | uimsbf |
|     } | | |
|     language_length | 8 | uimsbf |
|     for (j=0; j<language_length; j++) { | | |
|       language_byte | 8 | uimsbf |
|     } | | |
|     role | 4 | bslbf |
|     aspect_ratio | 4 | bslbf |
|     easy_reader | 1 | bslbf |
|     profile | 2 | bslbf |
|     3d_support | 1 | bslbf |
|     reserved | 4 | bslbf |
|   } | | |
|   for (i=0; i<N; i++) { | | |
|     reserved | 8 | bslbf |
|   } | | |
| } | | |

710 (upper table region)
720 (role through reserved rows)

FIG. 7B

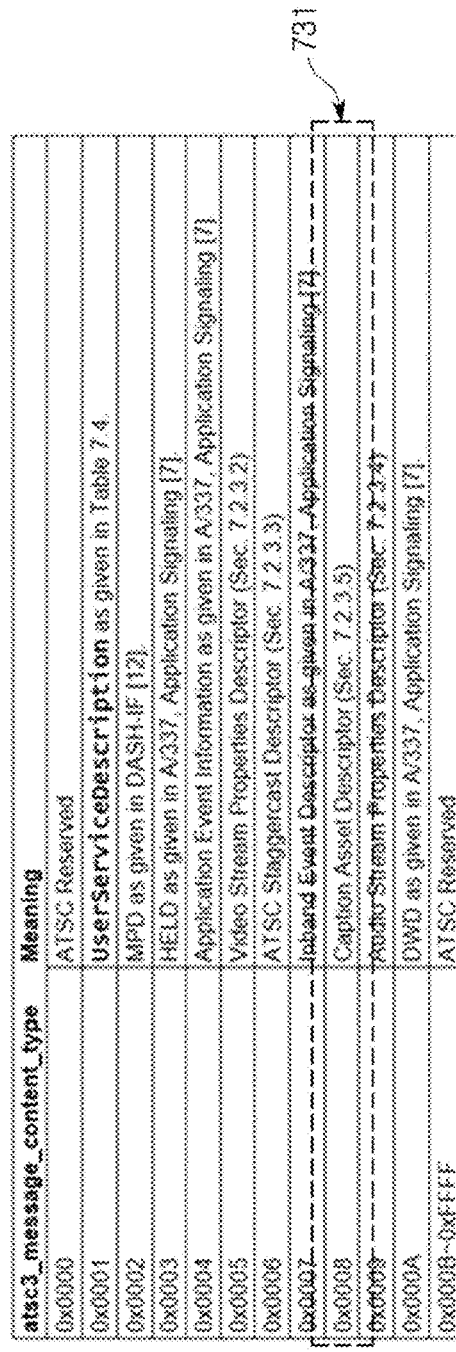

| atsc3_message_content_type | Meaning |
|---|---|
| 0x0000 | ATSC Reserved |
| 0x0001 | UserServiceDescription as given in Table 7.4 |
| 0x0002 | MPD as given in DASH-IF [12] |
| 0x0003 | HELD as given in A/337, Application Signaling [7] |
| 0x0004 | Application Event Information as given in A/337, Application Signaling [7] |
| 0x0005 | Video Stream Properties Descriptor (Sec. 7.2.3.2) |
| 0x0006 | ATSC Staggercast Descriptor (Sec. 7.2.3.3) |
| 0x0007 | Inband Event Descriptor as given in A/337, Application Signaling [7] |
| 0x0008 | Caption Asset Descriptor (Sec. 7.2.3.5) |
| 0x0009 | Audio Stream Properties Descriptor (Sec. 7.2.3.4) |
| 0x000A | DWD as given in A/337, Application Signaling [7] |
| 0x000B-0xFFFF | ATSC Reserved |

FIG. 8

```
<?xml version="1.0" encoding="UTF-8"?>
<tt xml:lang="it" ttp:extent="320px 240px"
  xmlns:ttp="http://www.w3.org/ns/ttml/profile/imsc1#metadata"
  xmlns:smpte="http://www.smpte-ra.org/schemas/2052-1/2010/smpte-tt"
  xmlns:tts="http://www.w3.org/ns/ttml#styling"
  ttp:profile="http://www.w3.org/ns/ttml/profile/imsc1/image"
  xmlns:itts="http://www.w3.org/ns/ttml#parameter" xmlns="http://www.w3.org/ns/ttml">
  <head>
    <layout>
      <region tts:extent="180px 20px" tts:origin="20px 215px" xml:id="area1"/>
    </layout>
  </head>
  <body>
    <div smpte:backgroundImage="happiness.png" region="area1" end="9s" begin="1s">
      <metadata>
        <itm:altText>FACE WITH HAPPY SMILE</itm:altText>
        <emotion>Happiness</emotion>
      </metadata>
    </div>
  </body>
</tt>
```

800

810

820

821

822

APPARATUS AND METHOD FOR TRANSMITTING BROADCAST CONTENT BASED ON ATSC 3.0, AND APPARATUS AND METHOD FOR RECEIVING BROADCAST CONTENT BASED ATSC 3.0

CROSS REFERENCE TO RELATED APPLICATION

The present application claims priority to Korean Patent Application Nos. 10-2019-0105277, filed Aug. 27, 2019, 10-2019-0130220, filed Oct. 18, 2019, and 10-2020-0108474, filed Aug. 27, 2020, the entire contents of which are incorporated herein for all purposes by this reference.

BACKGROUND OF THE INVENTION

1. Field of the Invention

The present disclosure relates to a next-generation terrestrial broadcast system based on ATSC 3.0, and, more particularly, to a method and apparatus for transmitting and receiving moving image caption information in a next-generation terrestrial broadcast system.

2. Description of Related Art

With development of portable devices, broadcast transmission/reception is possible even in mobile devices. Accordingly, a broadcasting signal transmission system suitable for a mobile broadcasting environment is being established.

The broadcasting signal transmission system basically includes a configuration for transmitting a caption included in broadcast content, and defines signaling or description for transmitting the caption included in the broadcast content.

However, the caption included in the broadcast content generally includes only text data and thus various types of caption data may not be transmitted.

SUMMARY OF THE INVENTION

Although a mobile broadcast system and, more particularly, ATSC 3.0 includes a configuration for transmitting an image-type caption, the image-type caption may not sufficiently reflect a situation description of a specific situation scene in the broadcast content or the emotion and emotional expression information of actors.

An object of the present disclosure is to provide a broadcast content transmission apparatus and method and a broadcast content reception apparatus and method, which are capable of providing a moving image caption service using signaling and description used in ATSC 3.0.

Another object of the present disclosure is to provide a broadcast content transmission apparatus and method and a broadcast content reception apparatus and method, which are capable of providing a moving image caption service to viewers through moving image file transmission compatible with the image standard of an existing caption file standard.

Another object of the present disclosure is to provide a broadcast content transmission apparatus and method and a broadcast content reception apparatus and method, which are capable of accurately delivering emotional expression and situation description through moving image file transmission.

The technical problems solved by the present disclosure are not limited to the above technical problems and other technical problems which are not described herein will become apparent to those skilled in the art from the following description According to an aspect of the present disclosure, provided is a broadcast content transmission method including checking input of moving caption data, configuring signaling information of the moving caption data based on signaling and description defined in a broadcast service system, configuring broadcast content data, into which the signaling information of the moving caption data is inserted, and transmitting the broadcast content data, into which the signaling information of the moving caption data is inserted.

According to another aspect of the present disclosure, provided is a broadcast content transmission apparatus including at least one processor and at least one storage medium, wherein the at least one processor is configured to check input of moving caption data, configure signaling information of the moving caption data based on signaling and description defined in a broadcast service system, configure broadcast content data, into which the signaling information of the moving caption data is inserted, and transmit the broadcast content data, into which the signaling information of the moving caption data is inserted.

According to another aspect of the present disclosure, provided is a method of receiving broadcast content including checking signaling information of moving caption data based on to signaling and description defined in a broadcast service system, checking the moving caption data based on the signaling information of the moving caption data, and reproducing the broadcast content and the moving caption data.

Features briefly summarized above with respect to the present disclosure are only exemplary aspects of the detailed description of the present disclosure described below, and do not limit the scope of the present disclosure.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a view illustrating a media presentation description (MPD) used in a broadcast content transmission apparatus according to an embodiment of the present disclosure;

Figure 9:
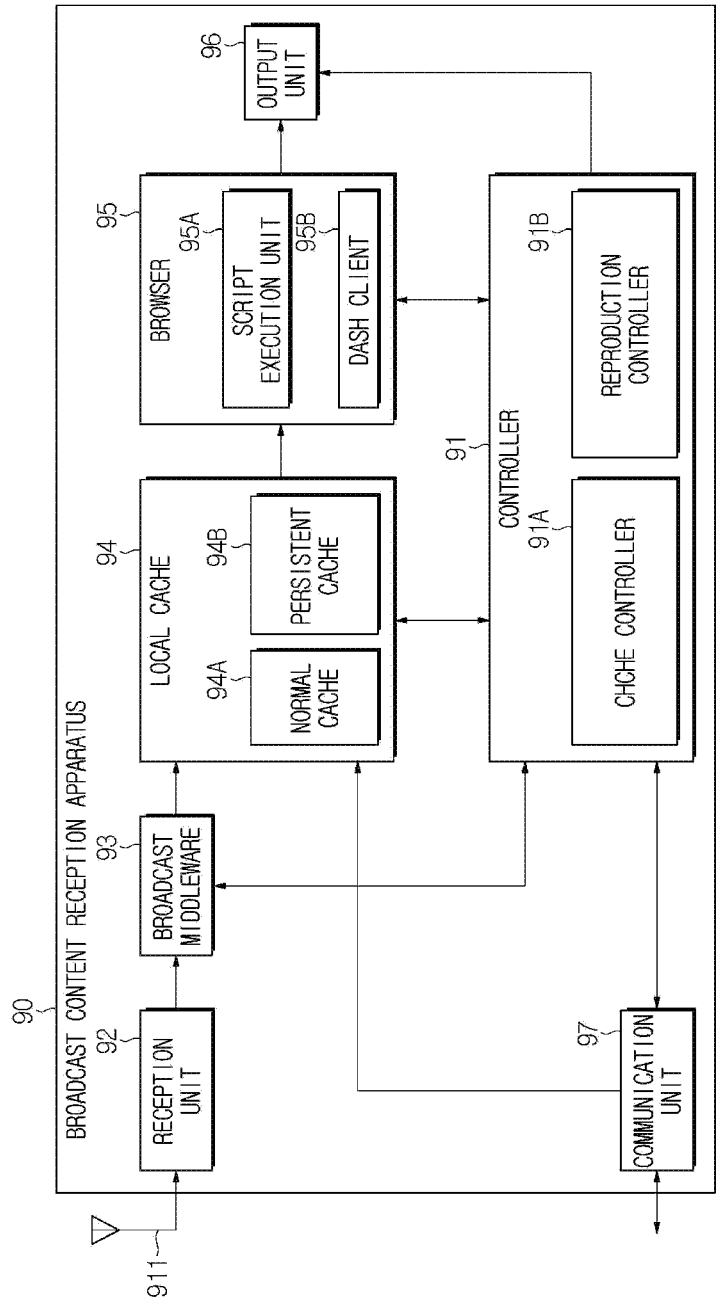
Figure 10:
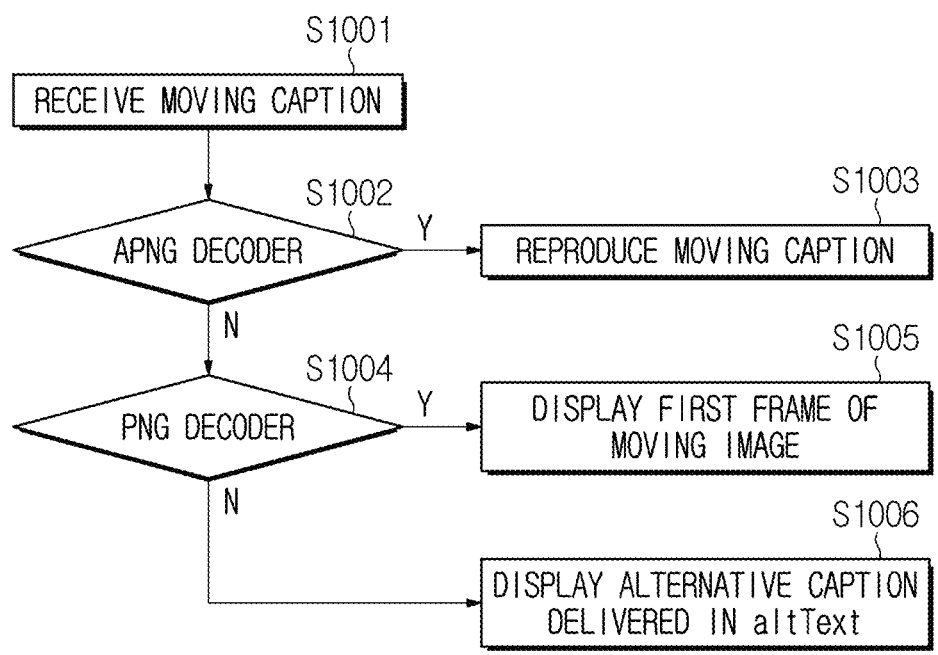
Figure 11:
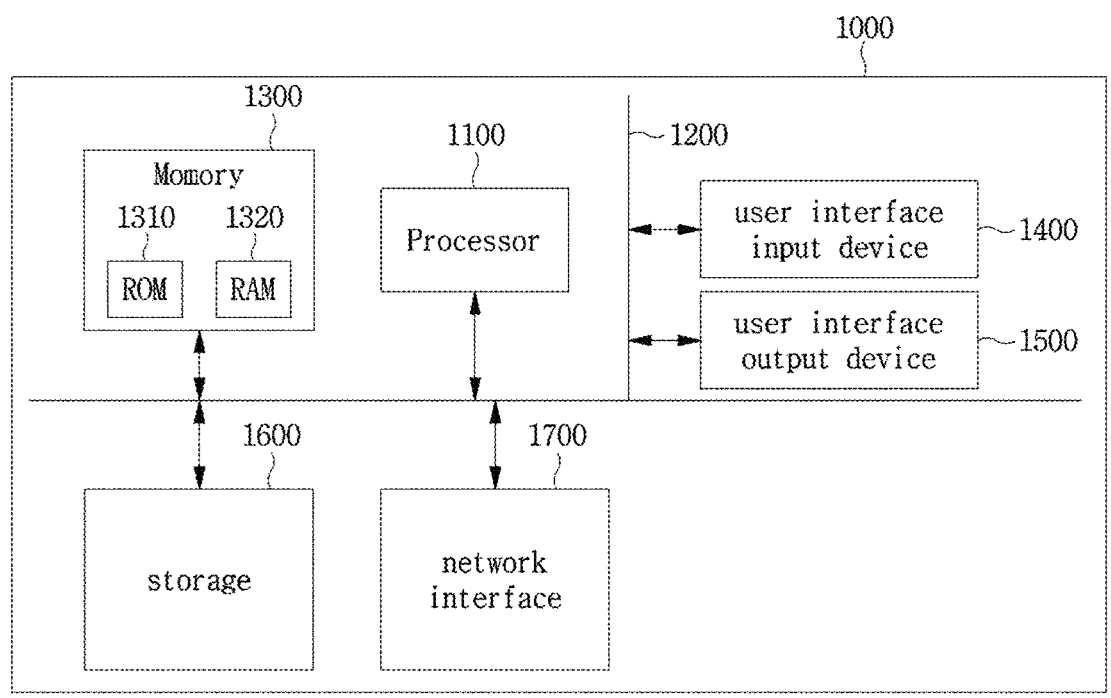

to FIG. 5A is a view illustrating a user service bundle description (USBD) used in a broadcast content transmission apparatus according to an embodiment of the present disclosure;

FIG. 5B is a view illustrating a description defining the attributes of elements used in the USBD of FIG. 5A;

FIG. 6A is a view illustrating MMT specific signaling used in a broadcast content transmission apparatus according to an embodiment of the present disclosure;

FIG. 6B is a view illustrating a description defining the attributes of elements used in the MMT specific signaling of FIG. 6A;

FIG. 7A is a view illustrating the syntax of caption asset descriptor used in a broadcast content transmission apparatus according to an embodiment of the present disclosure;

FIG. 7B is a view illustrating the attributes of caption asset descriptor in the syntax of FIG. 7a;

FIG. 8 is a view illustrating an emotional expression tag used in a broadcast content transmission apparatus according to an embodiment of the present disclosure;

FIG. 9 is a view illustrating a detailed configuration of a broadcast content reception apparatus according to an embodiment of the present disclosure;

FIG. 10 is a view illustrating detailed operation of a browser provided in FIG. 9; and FIG. 11 is a block diagram illustrating a broadcast content transmission apparatus, a broadcast content reception apparatus, and a computing system for performing a broadcast content transmission method and a broadcast content reception method according to an embodiment of the present disclosure.

DESCRIPTION OF THE PREFERRED EMBODIMENTS

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, the embodiments of the present disclosure will be described with reference to the accompanying drawings.

Figure 1:
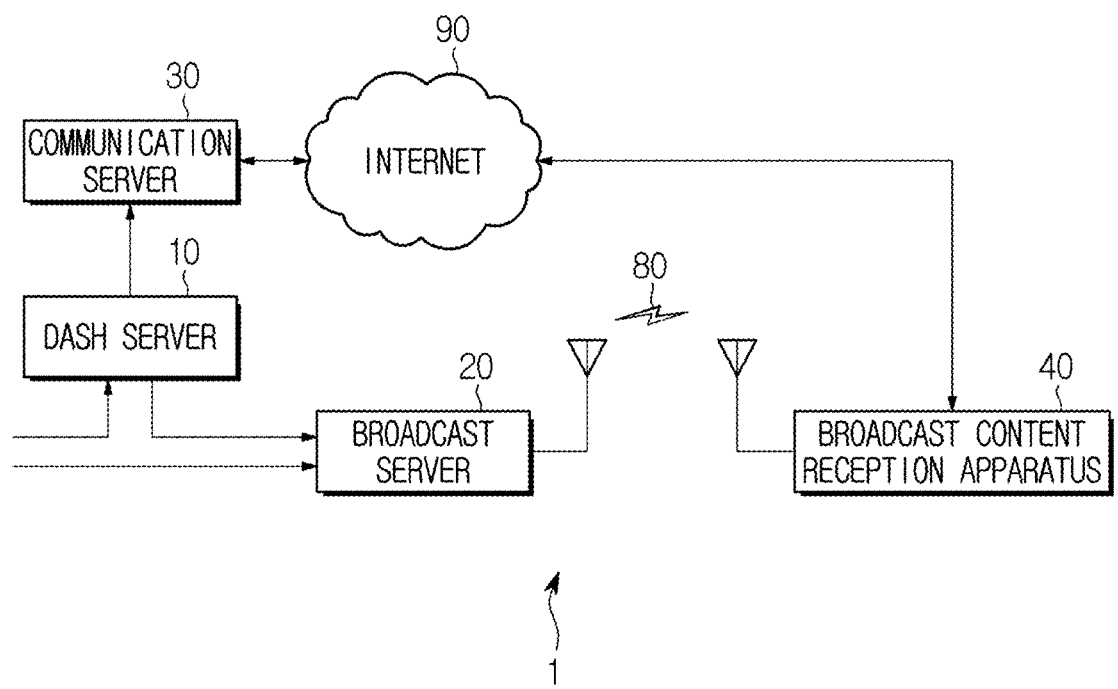
FIG. 1 is a diagram illustrating an example of a broadcast system, to which a broadcast content transmission apparatus according to an embodiment of the present disclosure is applied.

FIG. 1 is a diagram illustrating an example of a broadcast system, to which a broadcast content transmission apparatus according to an embodiment of the present disclosure is applied.

Referring to FIG. 1, a broadcast system 1 includes a DASH server 10, a broadcast server 20, a communication server 30, and a broadcast content reception apparatus 40.

The DASH server 10 provides a service corresponding to MPEG-DASH (dynamic adaptive streaming over HTTP). Here, MPEG-DASH is a streaming delivery standard compliant with OTT-V (Over The Top Video) that relates to adaptive streaming delivery using hypertext transfer protocol (HTTP)-based streaming protocol.

In the MPEG-DASH standard, a manifest file for describing metadata, management information of video and audio files and a file format for transporting video content are specified. At this time, a manifest file is referred to as a "media presentation description (MPD)". In addition, a file format for transmitting the video content is also referred to as a "segment format".

The DASH server 10 may generate files of a program content segment (hereinafter also referred to as a DASH segment) and transmit the files to the broadcast server 20 or the communication server 30. In addition, the DASH server 10 may generate and transmit MPD metadata to the broadcast server 20 or the communication server 30.

In addition, the DASH server 10 generates and transmits an application to the broadcast server 20 or the communication server 30. As the application, for example, a scrip application that may execute a script may be included. The script application may include applications developed using a markup language such as HTML5 (HyperText Markup Language 5) or a script language such as JavaScript (registered trademark).

The broadcast server 20 is a transmitter capable of data transport compliant with a digital broadcasting standard such as ATSC 3.0. The broadcast server 20 may process DASH segments, MPD metadata, and application files received from the DASH server 10 and transmit them together with signaling via a transport channel 80.

In addition, NRT content is input to the broadcast server 20. NRT content is content transported by NRT (Non Real Time) broadcasting and reproduced after being stored temporarily in a storage of the broadcast content reception apparatus 40. The broadcast server 20 may process and transmit an NRT content file via the transport channel 80.

The communication server 30 provides various types of data via the Internet 90 in response to a request from the broadcast content reception apparatus 40 connected to the Internet 90. The communication server 30 processes DASH segments, MPD metadata, and application files received from the DASH server 10. Then, the communication server 30 transmits various types of files via the Internet 90 in response to a request from the broadcast content reception apparatus 40.

The broadcast content reception apparatus 40 is a receiver capable of receiving transported data compliant with a digital broadcasting standard such as ATSC 3.0. For example, the broadcast content reception apparatus 40 is a stationary receiver such as television receiver or set top box or a mobile receiver such as smartphone, mobile phone, or tablet computer. The broadcast content reception apparatus 40 may include, for example, a piece of equipment mounted to an automobile such as vehicle-mounted television.

The broadcast content reception apparatus 40 outputs images and sounds of content such as broadcast programs by receiving and processing files such as DASH segments, MPD metadata, applications, and NRT content received from the broadcast server 20 via the transport channel 80.

In addition, in a case where equipped with a communication capability, the broadcast content reception apparatus 40 may acquire various types of files by accessing the communication server 30 via the Internet 90. For example, the broadcast content reception apparatus 40 outputs images and sounds of content such as VOD (Video On Demand) programs and advertisements by receiving and processing files such as DASH segments and MPD metadata received (adaptively delivered by streaming) from the communication server 30 via the Internet 90.

It should be noted that, in the broadcast system 1, the transport channel 80 may be not only terrestrial wave (terrestrial wave broadcasting) but also satellite broadcasting using a broadcasting satellite (BS) or communications satellite (CS) or wired broadcasting using cables (CATV).

Figure 2A:
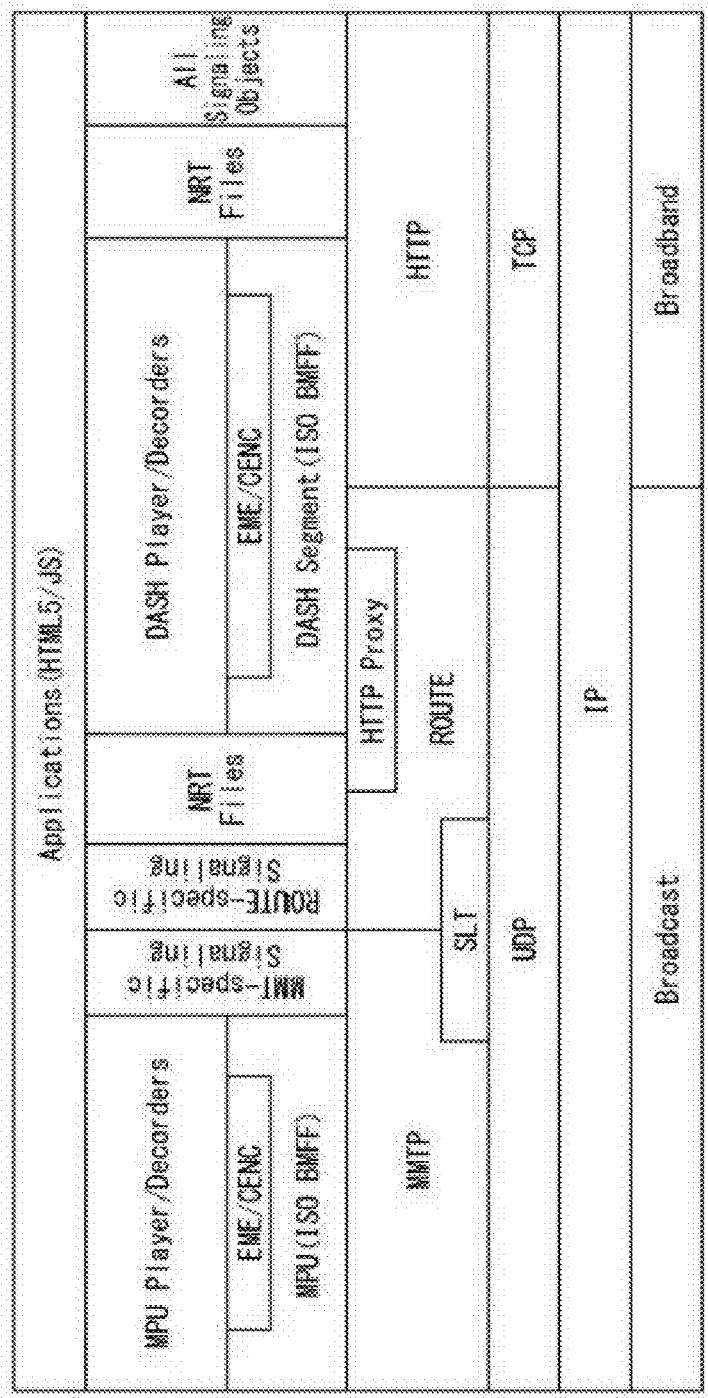
FIG. 2A is a view illustrating a protocol stack of an IP transport scheme used in the broadcast system of FIG. 1.
Figure 2B:
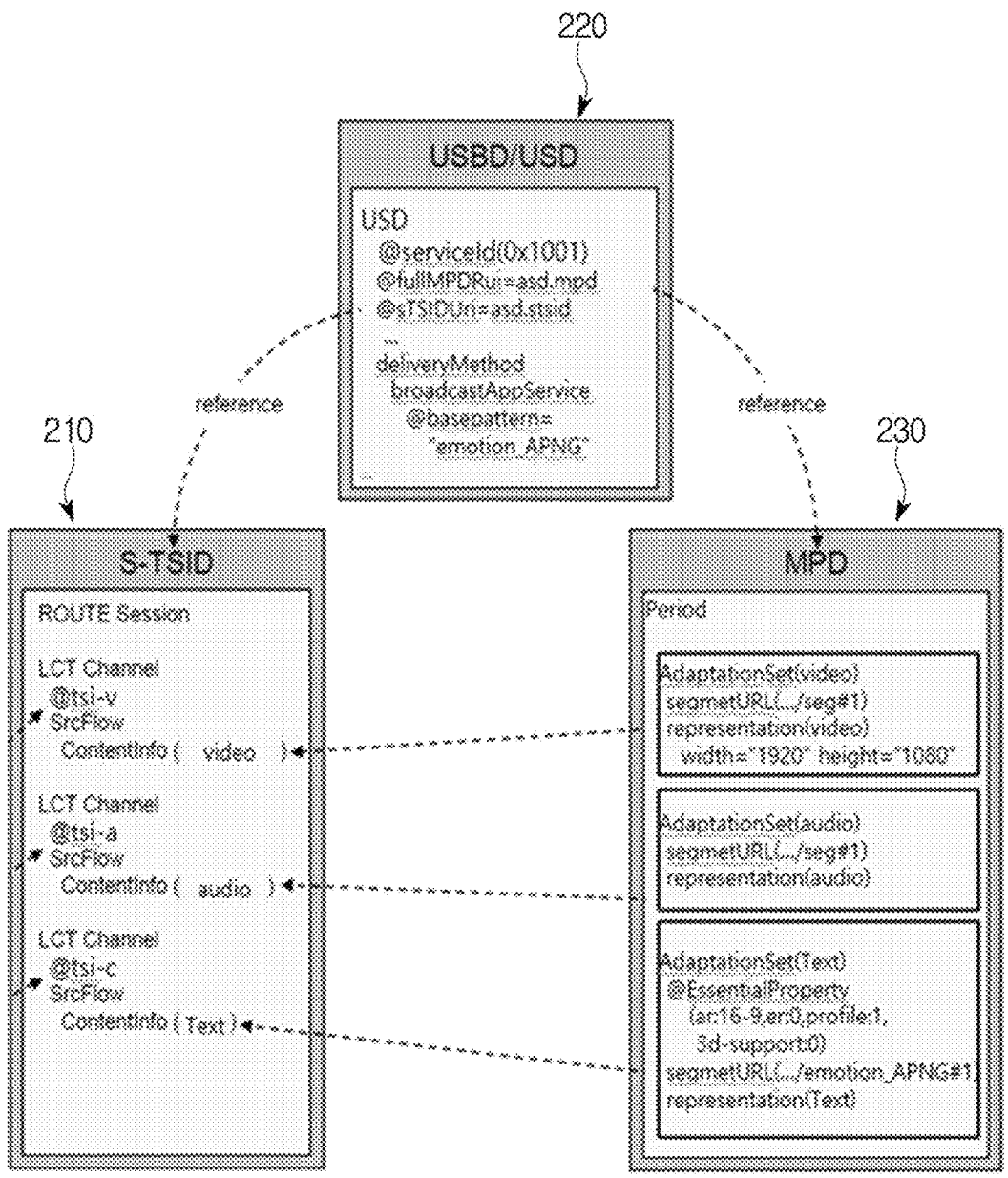
FIG. 2B is a view illustrating a ROUTE specific signaling information used in the broadcast system of FIG. 1.
Figure 2C:
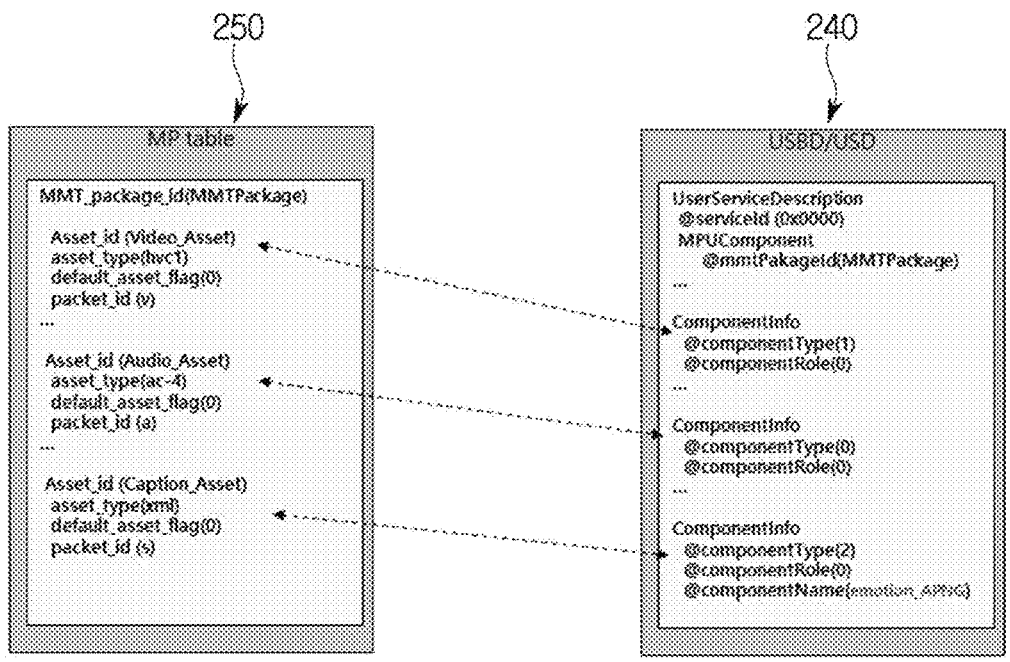
FIG. 2C is a view illustrating a MMT specific signaling information used in the broadcast system of FIG. 1.

FIG. 2A is a view illustrating a protocol stack of an IP transport scheme used in the broadcast system of FIG. 1.

In FIG. 2A, the lowermost layer may be a physical layer. Digital broadcasting in IP transport scheme such as ATSC 3.0 not only handles transport using unidirectional broadcasting but also transports some data by means of bidirectional communication. In a case where broadcasting is used, the physical layer thereof (broadcast) is associated with a broadcasting wave's frequency band assigned for services (channels).

A layer above the physical layer (broadcast) is an IP layer. The IP layer corresponds to a network layer in a hierarchical communication model. An IP packet is identified by an IP address. As an upper layer adjacent to the IP layer, a user datagram protocol (UDP) layer and a transmission control protocol (TCP) may be included.

First, as a layer above the UDP layer, ROUTE (Real-time Object Delivery over Unidirectional Transport) or MMTP (MPEG Media Transport Protocol) may be included.

In addition, the layer above the UDP layer, i.e., an IP packet including a UDP packet, is transported with SLT metadata contained therein. SLS metadata is LLS (Link Layer Signaling) signaling that includes basic information indicating a stream or service configuration in a broadcast network such as information required for tuning to a service (tuning information). It should be noted that LLS signaling is signaling acquired ahead of SLS (Service Layer Signaling) signaling, and SLS signaling is acquired in accordance with information included in LLS signaling.

ROUTE may be a protocol for streaming file transfer.

As an upper layer adjacent to ROUTE, ROUTE specific signaling and NRT content (NRT Files) may be included. This signaling is SLS signaling and includes metadata such as USBD (User Service Bundle Description), S-TSID (Service-based Transport Session Instance Description), MPD (Media Presentation Description), AST (Application Signaling Table), and so on.

USD metadata includes information such as other metadata acquisition destination. S-TSID metadata, an extension of LSID (LCT Session Instance Description) for ATSC 3.0, may include control information of the ROUTE protocol. MPD metadata is management information of video and audio files delivered by streaming. AST may include application control information.

In particular, ROUTE specific signaling may include signaling information for providing a moving caption service. To this end, ROUTE specific signaling may include an S-TSID 210, a USBD 220, and an MPD 230, and signaling information of a moving caption service may be contained in the S-TSID 210, the USBD 220 and the MPD 230.

ROUTE specific signaling is a signaling element provided based on the DASH and thus most of the signaling elements may be contained in the MPD. At this time, the USBD for URL verification and content information and information providing information on where each segment is transmitted to the LCT channel are provided. At this time, the USBD and the MPD each contain information on additional elements for the content, but the S-TSID does not additionally contain information on the content. Accordingly, in an embodiment of the present disclosure, in ROUTE specific signaling, elements for USBD and MPD will be focused upon. Meanwhile, in ROUTE specific signaling according to an embodiment of the present disclosure, the S-TSID refers to an element proposed in the ATSC 3.0 standard specification.

It should be noted that NRT content is an example of content transported over a ROUTE session, and may include application or electronic service guide (ESG). In another example, NRT content may be transmitted over a ROUTE session.

The upper layer adjacent to ROUTE may include DASH Segment (ISO BMFF). In addition, the upper layer adjacent to the DASH Segment (ISO BMFF) may include DASH Player/Decoders. That is, in a case where ROUTE is used as a transport protocol, stream data of a service component (e.g., video, audio, subtitle) making up content such as broadcast program may be transported over a ROUTE session in units of a DASH Segment compliant with the ISO BMFF (ISO Base Media File Format) standard.

On the other hand, MMTP is a protocol for streaming file transfer. The upper layer adjacent to MMTP may include MMTP specific Signaling. This MMT specific signaling may include, for example, metadata such as USBD (User Service Bundle Description) 240 and MPT (MMT Package Table) 250.

In particular, MMT specific signaling may include signaling information for providing a moving caption service. At this time, the signaling information for providing the moving caption service may be contained via the USBD 240 or the MPT 250. Further, the information contained in the USBD 240 or the MPT 250 will be described with reference to FIGS. 6a, 6b, 7a and 7b.

In addition, the upper layers adjacent to MMTP may include MPU (Media Processing to Unit) (ISO BMFF). In addition, the upper layer adjacent to MPU (ISO BMFF) may be composed of DASH Player/Decoders. That is, in a case where MMT is used as a transport protocol, stream data of a service component (e.g., video, audio, subtitle or the like) making up content such as broadcast program is transported over an MMTP session in units of an MPU compliant with the ISO BMFF (ISO Base Media File Format) standard.

Thus, in the protocol stack depicted in FIG. 2A, both ROUTE and MMTP are represented as a transport protocol. In unidirectional broadcasting-based streaming delivery, therefore, one of the two protocols, namely, ROUTE protocol that transports a DASH Segment (ISO BMFF) file or MMTP that transports an MPU (ISO BMFF) file, may be used.

Meanwhile, in a case where bidirectional communication is used, the layer above the physical layer (Broadband) is the IP layer that corresponds to the network layer. Also, the upper layer adjacent to the IP layer is a TCP (Transmission Control Protocol) layer that corresponds to the transport layer, and further, an upper layer adjacent to the TCP layer is an HTTP layer that corresponds to an application layer. That is, thanks to these layers, TCP/IP and other protocols working in networks such as the Internet 90 are implemented.

The upper layer adjacent to the HTTP layer may include signaling (All Signaling Objects) and NRT content (NRT Files). This signaling (All Signaling Objects) includes signaling transported by ROUTE and MMTP described above. Also, NRT content is an example of content acquired via communication. In another example, NRT content may be configured to be transmitted via content such as application.

The upper layer adjacent to the HTTP layer may include DASH Segment (ISO BMFF). Further, the upper layer adjacent to the DASH Segment (ISO BMFF) may include DASH Player/Decoders. That is, in bidirectional communication-based streaming delivery, stream data of a service component (e.g., video, audio, subtitle or the like) making up content such as VOD io program may be configured and transported in units of a DASH Segment compliant with the ISO BMFF standard.

In addition, applications can be transported by using a unidirectional broadcasting protocol such as ROUTE or MMTP and a bidirectional communication protocol such as TCP/IP. For example, these applications can include applications developed with HTML5 or JS (JavaScript (registered trademark)).

Further, in the case where a DASH Segment (ISO BMFF) file is acquired by an application, broadcast middleware implemented in the broadcast content reception apparatus 40 may function as an HTTP server. The ROUTE layer may include a HTTP proxy.

EME/CENC (Encrypted Media Extension/Common Encryption Scheme) compliant with W3C (World Wide Web Consortium) and MPEG (Moving Picture Experts Group) may be adopted as a security framework for content protection. Therefore, DASH Segment (ISO BMFF) and MPU (ISO BMFF) may include EME/CENC.

In addition, metadata including SLT metadata as LLS signaling and USBD, S-TSID, MPD, and AST as SLS signaling are written in a markup language such as XML (Extensible Markup Language).

As described above, in the protocol stack of the IP transport scheme of the present technology, unidirectional broadcasting-based layers and some of bidirectional communication-based layers serve as a common protocol, allowing stream data of a service component making up content to be transported through unidirectional broadcasting and bidirectional communication in units of a DASH Segment compliant with the ISO BMFF standard. For this reason, in a case where both unidirectional broadcasting-based streaming deliver)/and bidirectional communication-based streaming delivery take place, implementation load and processing load can be reduced, for example, in the broadcast server 20 and the broadcast content reception apparatus 40 because the upper layer protocol has been commonized.

Figure 3A:
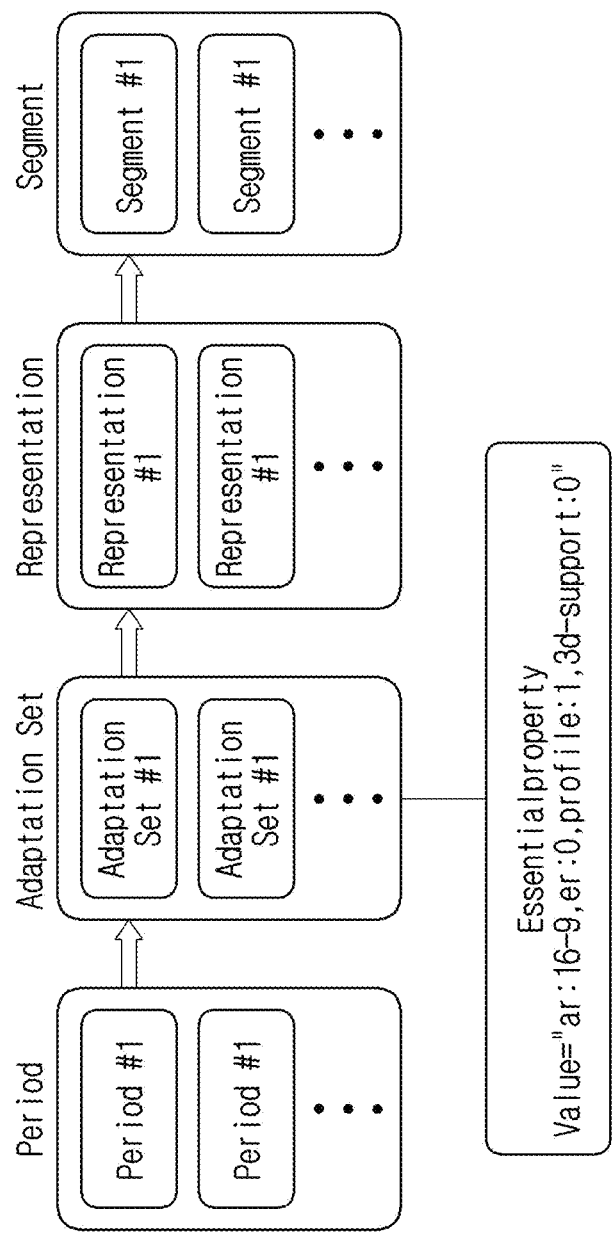
FIG. 3A is a view illustrating the structure of a DASH used in a broadcast content transmission apparatus according to an embodiment of the present disclosure.
Figure 3B:
FIGS. 3B and 3C are views illustrating the structure of a DASH used in a broadcast content transmission apparatus according to an embodiment of the present disclosure.
Figure 3C:

FIG. 3A is a view illustrating the structure of a DASH used in a broadcast content transmission apparatus according to an embodiment of the present disclosure.

Referring to FIG. 3A, the DASH may be formed in a hierarchical structure. For example, the DASH may be configured in period units of content, an adaptation set unit may be configured as a sub-unit of the period unit, a representation unit may be configured as a sub-unit of the adaptation set unit, and a segment unit may be configured as a sub-unit of the representation unit. At this time, the period unit may describe the configuration of a service such as content, the adaptation set unit and the representation unit may be composed of streams of service components such as video, audio or subtitle and may be configured to describe the attributes of each stream.

In particular, a unit for providing a moving caption service may be divided according to the property of content. Accordingly, the moving caption service may be configured in correspondence with the adaptation set unit. Therefore, when the DASH is configured, attribute information of a moving captain service (hereinafter referred to as moving caption attribute information) may be configured and inserted by adaptation set units.

At this time, the moving caption service may include caption data describing the context of content, caption data for delivering emotion and emotional expression information, and the like. Hereinafter, information on a caption service describing the context of content and a caption service for delivering emotion and emotional expression information is referred to as "moving caption attribute information".

Further, the moving caption attribute information may be contained subsequent to the adaptation set unit.

The moving caption attribute information may be configured to present an element describing the characteristics of the caption and record one of predefined values in Value. For example, it is possible to record use of an image profile by setting a profile value set for APNG which is a moving image file to "1".

For example, the moving caption attribute information may be contained in the MPD 400 (see FIG. 4A). Specifically, in an element 401 containing the basic attribute information of the MPD 400, emotional caption attribute information may be indicated by setting a value contained in a profile attribute 411 describing the profile of the caption to "0" or "1". For example, a caption composed of text may be indicated when the value contained in the profile attribute 411 is "0", and a caption composed of APNG which is a moving image file may be indicated when the value contained in the profile attribute 411 is "1".

Since APNG is a format maintaining backward compatibility and thus may be transmitted using existing signaling without an additional element. However, in this case, since an existing PNG caption composed of a motionless image and a caption composed of a moving image file are not identified, it is necessary to additionally contain a file name element 413 to identify these captions using the file name written at the URL. At this time, the URL may be checked by Basepattern provided by the USBD.

FIG. 5A is a view illustrating a user service bundle description (USBD) used in a broadcast content transmission apparatus according to an embodiment of the present disclosure, and FIG. 5B is a view illustrating a description defining the attributes of elements used in the USBD of FIG. 5a.

Referring to FIG. 5A, the USBD 500 used in the broadcast content transmission apparatus according to the embodiment of the present disclosure is a format used in the ROUTE protocol and may be configured in the form of an xml file. The USBD 500 may include an element 510 defining information on transmission of a broadcast service, the element 510 defining the broadcast service may contain information on video, audio, a normal caption and a moving caption (e.g., APNG caption) via an element defining basepattern. In particular, the element 510 defining the broadcast service may include an element 511 containing information on a moving caption (e.g., APNG caption).

Meanwhile, a basepattern definition 521 of the broadcast service may be provided via a description 520, and the broadcast content reception apparatus may perform operation of processing broadcast data by referring to the description 520. For example, the broadcast content reception apparatus may check the basepattern element 521 in the element 520 defining the broadcast service, of the information contained in the USB 500 based on the ROUTE protocol, based on the description 520. At this time, the broadcast content reception apparatus may check the file name value specified by string data and determine that the moving caption is contained when the file name value includes "APNG-caption".

Although the basepattern element is described as being set to "APNG-caption" to indicate whether the moving caption is contained, the present disclosure is not limited thereto and various methods of indicating whether the moving caption is contained may be used.

FIG. 6A is a view illustrating MMT specific signaling used in a broadcast content transmission apparatus according to an embodiment of the present disclosure, and FIG. 6B is a view illustrating a description defining the attributes of elements used in the MMT specific signaling of FIG. 6A.

First, referring to FIG. 6A, in one embodiment of the present disclosure, MMT specific signaling 600 is MMTP-based signaling, and may contain ComponentRole 611 and ComponentType 612 respectively describing the role and type of content. At this time, ComponentRole 611 may set the role of the component and may include information indicating the role such as a basic role and a special effect role. For example, when the value of ComponentRole 611 is set to "0", this indicates a "basic" role and, when the value of ComponentRole 611 is set to "1", this indicates a "special effect" role. In addition, ComponentType 612 sets the type of the component caption and may contain information indicating the type such as video, audio, subtitle, etc. For example, when ComponentType 612 is to set to "0", this indicates "video". When ComponentType 612 is set to "1", this indicates "audio". When ComponentType 612 is set to "2", this indicates "subtitle". For example, when the basic caption and the moving caption are simultaneously transmitted, ComponentType 612 is set to "2", and ComponentRole 611 is set to "0".

FIG. 7A is a view illustrating the syntax of caption asset descriptor used in a broadcast content transmission apparatus according to an embodiment of the present disclosure, and FIG. 7b is a view illustrating the attributes of caption asset descriptor in the syntax of FIG. 7a.

The syntax 710 for caption asset descriptor shown in FIG. 7A may be provided to deliver the additional settings of the moving caption in the MMTP. The syntax 710 for caption_asset_descriptor may include elements indicating the settings of the moving caption and may include elements 720 such as easyReader, ratio, profile, etc. described in the MPD.

Further, in order to transmit the moving caption, it is necessary to contain a value indicating the image profile in the profile element. At this time, in the MMTP, since 2 bits are assigned to the profile, it is possible to indicate the image profile, by setting a value of "01".

Meanwhile, even if the syntax 710 for caption asset descriptor is received, when what is defined in caption asset descriptor is not known, the broadcast content reception apparatus according to an embodiment of the present disclosure may not check the information contained in the syntax 710. Accordingly, the broadcast content transmission apparatus according to the embodiment of the present disclosure needs to transmit Caption_asset_descriptor to the broadcast content reception apparatus. At this time, Caption_asset_descriptor may be contained in atsc3_message content which is the payload of mmt_atsc3_message and transmitted to the broadcast content reception apparatus. Further, by setting the value of atsc3_message_content_type to "0x0008", it is possible to indicate transmission of Caption_asset_descriptor.

FIG. 8 is a view illustrating an emotional expression tag used in a broadcast content transmission apparatus according to an embodiment of the present disclosure.

Referring to FIG. 8, the broadcast content transmission apparatus according to an embodiment of the present disclosure may use an emotional expression tag 800 to transmit a moving caption. The emotional expression tag 800 may include information indicating that an image for emotional expression is included in the caption, which may include a div element 810. The div element 810 may include an image file indicator for emotional expression (backgroundImage), an indicator of a region in which an image is displayed (region), an indicator indicating a beginning point of an image (begin), an indicator indicating an end point of an image (end), etc.

In particular, the div element 810 may include metadata 820 as a sub-element. The metadata 820 may include an AM: altText element 821. At this time, when an image may not be used, the Aim altText element 821 may contain text to be displayed in place of the image. In addition, the metadata 820 may include an element (Emotion) 822 indicating the emotional expression. The element (Emotion) 822 indicating the emotional expression may be configured in a string type. For example, the string type of the element (Emotion) indicating the emotional expression may be defined as Table 1 below.

TABLE 1

| String type |
| --- |
| Happiness |
| Anger |
| Surprise |
| Sadness |
| Fear |
| Neutral |
| Disgust |
| Excitement |

Additionally, the string type of the element (Emotion) indicating the emotional expression may include information indicating a situation description for a specific scene of onomatopoeia series such as vibration telephone ring.

Based on the above description, the broadcast content reception apparatus may check the element (Emotion) indicating the emotional expression and directly output the element (Emotion) indicating the emotional expression.

Although, in the embodiment of the present disclosure, the broadcast content reception apparatus is described as checking the element (Emotion) indicating the emotional expression and directly outputting the element (Emotion) indicating the emotional expression, the present disclosure is not limited thereto and various methods of outputting emotional expression information in correspondence with the element (Emotion) indicating the emotional expression may be used. For example, the broadcast content reception apparatus may check the element (Emotion) indicating the emotional expression and extract and output data corresponding to the element (Emotion) indicating the emotional expression of emotional expression data pre-stored in the broadcast content reception apparatus.

FIG. 9 is a view illustrating a detailed configuration of a broadcast content reception apparatus according to an embodiment of the present disclosure.

The broadcast content reception apparatus 40 includes a controller 91, a reception unit 92, broadcast middleware 93, a local cache 94, a browser 95, an output unit 96, and a communication unit 97.

The controller 91 controls the operation of the respective units of the broadcast content reception apparatus 40.

The reception unit 92 receives and processes the broadcast wave (digital broadcast signal) received from the broadcast server 20 using an antenna 411 via the transport channel 80 and supplies the data acquired therefrom to the broadcast middleware 93. It should be noted that the reception unit 92 includes, for example, a tuner.

The broadcast middleware 93 processes the data received from the reception unit 92 and supplies the processed data to the controller 91 and the local cache 94. Here, of the data to be processed, the DASH segment, the script application, and the MPD metadata are supplied to the local cache 94. In addition, the signaling is supplied to the controller 91.

The controller 91 includes a cache controller 91A and a reproduction controller 91B. The cache controller 91A controls the local cache 94 based on signaling supplied from the broadcast middleware 93, a request from the browser 95, and so on.

In addition, the reproduction controller 91B controls the browser 95 based on signaling supplied from the broadcast middleware 93 and so on.

In particular, the reproduction controller 91B checks signaling based on the ROUTH protocol and controls reproduction of data related to an emotional caption based on the checked signaling. For example, the reproduction controller 91B may check a basepattern element 521 in an element 520 (see FIG. 5a) defining a broadcast service contained in the USDB. At this time, the reproduction controller 91B may check a file name value designated as string data and check that a moving caption is contained when the file name value is composed of "APNG-caption". Therefore, the reproduction controller 91B may control moving caption output of a corresponding unit (e.g., adaptation set unit).

In another example, the reproduction controller 91B checks MMTP-based signaling and controls reproduction of data related to a moving caption based on the checked signaling. For example, the reproduction controller 91B may check element values set in ComponentRole 611 (see FIG. 6a) and ComponentType 612 contained in MMT specific signaling. The reproduction controller 91B may determine that a "basic role" is indicated when the value of ComponentRole 611 is set to "0" and determine that a "special role" is indicated when the value of ComponentRole 611 is set to "1". In addition, the reproduction controller 91B may determine that "video" is to indicated when ComponentType 612 is set to "0", determine that "audio" is indicated when ComponentType 612 is set to "1", and determine that "subtitle" is indicated when ComponentType 612 is set to "2". In addition, the reproduction controller 91B may control reproduction of data related to the moving caption according to the element values set in ComponentRole 611 and ComponentType 612.

In another example, the reproduction controller 91B may check MMTP-based signaling and check additional information delivered through the MPD. The reproduction controller 91B may check a profile element among the elements contained in the MPD, and may determine that the transmitted data is an image profile, by determining that the profile element is set to "01". In addition, the reproduction controller 91B controls reproduction of data related to the moving caption using the image profile. Meanwhile, the reproduction controller 91B may check a descriptor based on the value of atsc3_message_content_type element 730, and check information contained in the MPD based on the checked descriptor.

The local cache 94 is realized on an On Memory, SSD (Solid State Drive), or other local file system, for example. The local cache 94 caches data (files) received from the broadcast middleware 93 under control of the cache controller 91A Data such as DASH segment, script application, and MPD metadata is cached in the local cache 94. Also, the local cache 94 includes a normal cache 94A and a persistent cache 94B.

Here, the normal cache 94A is a normal cache, and data cached therein is deleted after an appropriate amount of time (a not-so-long time period) elapses. On the other hand, the persistent cache 94B is a special cache, and data cached therein has preferential persistence and remains cached for a longer time period than data cached in the normal cache 94A.

In the case where a quota domain identifier (of the cache quota domain) is specified in the signaling (quotaDomain attribute defined in the SLT metadata, USBD metadata, S-TSID metadata, or AST metadata included in the signaling) from the broadcast middleware 93, and when a request is made from the browser 95 (script execution unit 95A of the browser 95) to pull the target DASH segment and so on into the persistent cache 94B, the cache controller 91A pulls the target DASH segment and so on (the files thereof) into the persistent cache 94B.

As a result, a group of files such as DASH segment cached in the persistent cache 94B are linked by the quota domain identifier. As a result, a file such as DASH segment is shared among a plurality of services that belong to the same cache quota domain.

The browser 95 is a browser that supports HTML5, JavaScript (registered trademark), and so on. The browser 95 processes data (files) read from the local cache 94 under control of the reproduction controller 91B. The browser 95 includes the script execution unit 95A and a DASH client 95B.

The script execution unit 95A may execute a script written in a script language such as JavaScript (registered trademark). For example, the script execution unit 95A may read a script application from the local cache 94 (the normal cache 94A or the persistent cache 94B thereof) and execute the application.

In addition, the script execution unit 95A causes the cache controller 91A to control the local cache 94 by executing the CacheStorage API (Application Programming Interface) written in the script application.

The script execution unit 95A generates a period file that matches user preference and so on in response to an)(Link resolution request from the DASH client 95B and sends the file to the DASH client 95B as a response.

The DASH client 95B reads the MPD metadata (file thereof) from the local cache 94 (normal cache 94A thereof) and parses the MPD metadata (analyzes the syntax thereof). In accordance with the result of analyzing the MPD metadata, the DASH client 95B reads the DASH segment (file thereof) from the local cache 94 (normal cache 94A or persistent cache 94B thereof) and reproduces the segment.

The data of the DASH segment reproduced by the DASH client 95B is supplied to the output unit 96.

The output unit 96 outputs the data supplied from the DASH client 95B under control of the reproduction controller 91B. As a result, a broadcast program or content is reproduced, and video and audio thereof are output.

The communication unit 97 exchanges data with the communication server 30 via the Internet under control of the controller 91. Of the data received by the communication unit 97, the DASH segment, the script application, and the MPD metadata are supplied to the local cache 94. In addition, the signaling is supplied to the controller 91. Processes performed on these pieces of data acquired via communication are similar to those described above for the data acquired via broadcasting and thus the description thereof is omitted.

FIG. 10 is a view illustrating detailed operation of a browser provided in FIG. 9.

Referring to FIG. 10, the browser 95 may receive a caption file including a moving image (S1001), and differently configure information output via the output unit 96 according to the element capable of being processed by a caption decoder.

For example, when the browser 95 (or the output unit 96) includes a caption decoder capable of decoding APNG (S1002-Y), the browser 95 may output a moving image caption on a screen via the output unit 96 (S1003).

When the caption decoder provided in the browser 95 (or the output unit 96) does not support the APNG caption (S1002-N) but the basic IMSC1 or TTML standard is satisfied and a PNG decoder is included (S1004-Y), the browser 95 (or the output unit 96) may display only a first frame of an image on the screen instead of the moving image (S1005).

In another example, when the caption decoder provided in the browser 95 (or the output unit 96) cannot decode the image transmitted in the PNG format (S1004-N), the string contained in the Atm altText element 821 (see FIG. 8) of the emotional expression tag 800 may be checked, and the checked string may be output via the output unit 96 (S1006).

According to the present disclosure, it is possible to provide a broadcast content transmission apparatus and method and a broadcast content reception apparatus and method, which are capable of providing a moving image caption service using signaling and description used in ATSC 3.0.

According to the present disclosure, it is possible to provide a broadcast content transmission apparatus and method and a broadcast content reception apparatus and method, which are capable of providing a moving image caption service to viewers through moving image file transmission compatible with the image standard of an existing caption file standard.

According to the present disclosure, it is possible to provide a broadcast content transmission apparatus and method and a broadcast content reception apparatus and method, which are capable of accurately delivering emotional expression and situation description through moving image file transmission.

FIG. 11 is a block diagram illustrating a broadcast content transmission apparatus, a broadcast content reception apparatus, and a computing system for performing a broadcast content transmission method and a broadcast content reception method according to an embodiment of the present disclosure.

Referring to FIG. 11, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

It will be appreciated by persons skilled in the art that that the effects that can be achieved through the present disclosure are not limited to what has been particularly described hereinabove and other advantages of the present invention will be more clearly understood from the detailed description

What is claimed is:

1. A broadcast content transmission method comprising:
checking input of moving caption data;
configuring signaling information of the moving caption data based on signaling and description defined in a broadcast service system;
configuring broadcast content data, into which the signaling information of the moving caption data is inserted; and
transmitting the broadcast content data, into which the signaling information of the moving caption data is inserted,
wherein the configuring of the signaling information of the moving caption data comprises:
containing information on a moving image caption in a div element; and
containing a text caption element ittm:altText to replace reproduction of the image caption as a sub-element of the div element.

2. The broadcast content transmission method of claim 1, wherein the configuring of the signaling information of the moving caption data comprises containing moving caption attribute information in a media presentation description (MPD) element based on a Real-time Object Delivery over Unidirectional Transport (ROUTE) protocol.

3. The broadcast content transmission method of claim 2, wherein the containing of the moving caption attribute information in the MPD element comprises containing an indicator indicating a text caption or a moving image caption in a profile attribute included in the MPD element.

4. The broadcast content transmission method of claim 1, wherein the configuring of the signaling information of the moving caption data comprises containing an indicator indicating a moving image caption using an element defining a basepattern in a user service bundle description (USBD) based on a Real-time Object Delivery over Unidirectional Transport (ROUTE) protocol.

5. The broadcast content transmission method of claim 4, wherein the element defining the basepattern is provided in an element broadcastAppService defining information on transmission of a broadcast service.

6. The broadcast content transmission method of claim 1, wherein the configuring of the signaling information of the moving caption data comprises containing an indicator indicating a moving image caption using an element defining content information in a user service bundle description (USBD) based on an MPEG media transport protocol (MMTP).

7. The broadcast content transmission method of claim 6, wherein the element defining the content information in the USBD includes an element ComponentRole for setting a role of a component, and
wherein the element ComponentRole for setting the role of the component contains an indicator indicating a "basic" role or an indicator indicating a "special effect" role.

8. The broadcast content transmission method of claim 7, wherein the element defining the content information in the USBD includes an element ComponentType for setting a type of a component caption, and
wherein the element ComponentType for setting the type of the component caption contains at least one of an indicator indicating "video", an indicator indicating "audio" or an indicator indicating "caption".

9. The broadcast content transmission method of claim 8, wherein the configuring of the signaling information of the moving caption data comprises:
configuring the element ComponentType for setting the type of the component caption as the indicator indicating "caption"; and
configuring the element ComponentRole for setting the role of the component as the indicator indicating the "special effect" role.

10. The broadcast content transmission method of claim 1, wherein the configuring of the signaling information of the moving caption data comprises containing moving caption attribute information in a media presentation description (MPD) element based on an MPEG media transport protocol (MMTP).

11. The broadcast content transmission method of claim 10, further comprising setting a profile element contained in the MPD element as an indicator indicating an image profile.

12. The broadcast content transmission method of claim 11,
wherein the configuring of the signaling information of the moving caption data comprises configuring Caption_asset_descriptor, and
wherein the Caption asset descriptor is contained in atsc3 message content which is a payload of mmt_atsc3_message.

13. The broadcast content transmission method of claim 12, wherein information on transmission of Caption_asset_descriptor is contained in the atsc3_message_content by controlling a value of an atsc3_message_content_type element.

14. The broadcast content transmission method of claim 1, wherein the configuring of the signaling information of the moving caption data comprises containing an element Emotion indicating a type of an emotional expression as the sub-element of the div element.

* * * * *